Dec. 6, 1966 S. DRUCKER 3,289,668
SNOW AND ICE MELTING AND TRACTION DEVICE FOR VEHICLES
Filed Feb. 11, 1964 3 Sheets-Sheet 2

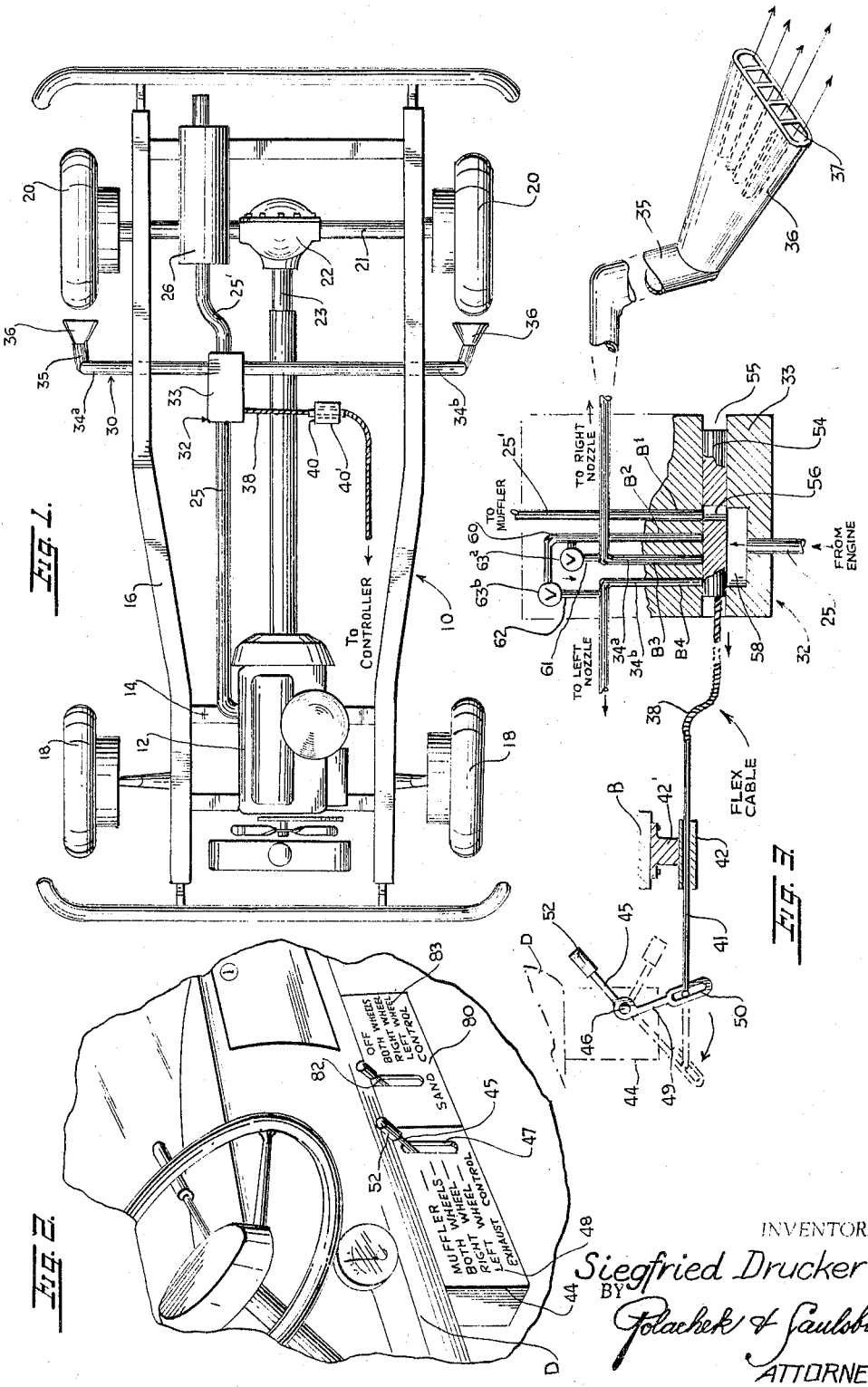

INVENTOR.
Siegfried Drucker
BY
Polachek & Saulsbury
ATTORNEYS.

Dec. 6, 1966     S. DRUCKER     3,289,668
SNOW AND ICE MELTING AND TRACTION DEVICE FOR VEHICLES
Filed Feb. 11, 1964     3 Sheets-Sheet 3
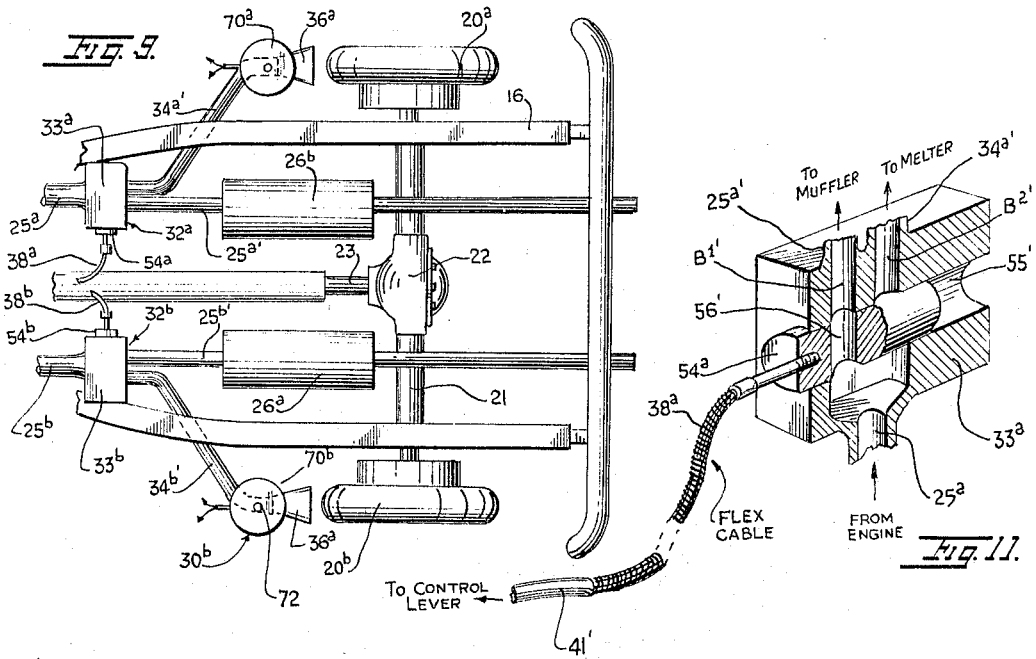
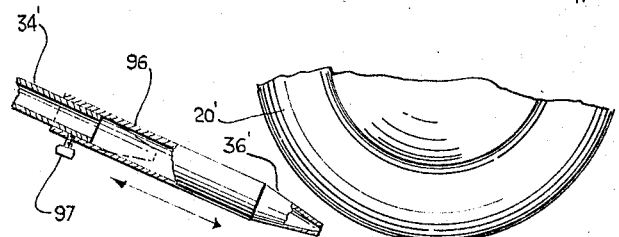
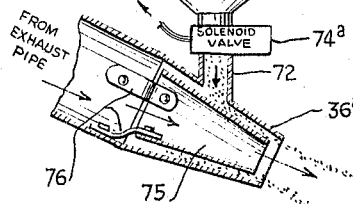
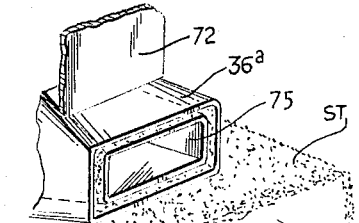
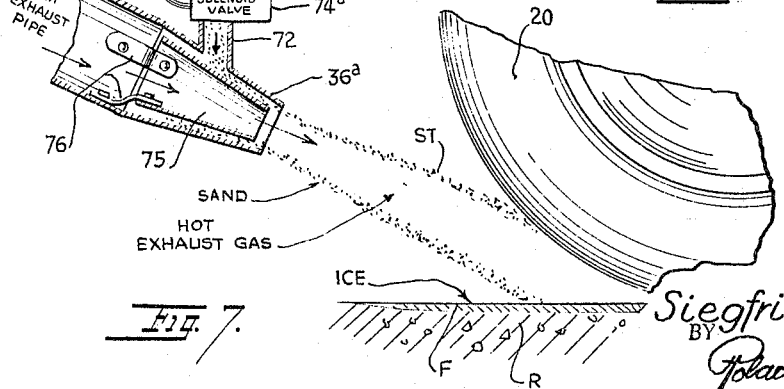
INVENTOR.
Siegfried Drucker
BY
Polachek & Saulsbury
ATTORNEYS.

United States Patent Office 3,289,668
Patented Dec. 6, 1966

3,289,668
SNOW AND ICE MELTING AND TRACTION
DEVICE FOR VEHICLES
Siegfried Drucker, 830 W. 177th St., New York, N.Y.
Filed Feb. 11, 1964, Ser. No. 344,010
4 Claims. (Cl. 126—271.1)

This invention concerns apparatus for melting snow and ice and for discharging sand in front of the wheels of an automotive vehicle to improve traction of these wheels.

A principal object of the invention is to provide means for melting snow and ice on a roadway whereby a path of limited width may be cleared in front of the traction wheels of an automotive vehicle as the vehicle is driven forwardly.

Another object is to provide apparatus which is permanently installed in an automotive vehicle having an internal combustion engine, exhaust muffler and exhaust pipe, with valve means for diverting hot exhaust gases in advance of the muffler to the apparatus from which the gases are discharged in front of the traction wheels of the vehicle.

A further object is to provide apparatus as described with further means for discharging sand in the streams of exhaust gases directed in front of the traction wheels of the vehicle.

Another object is to provide apparatus as described with means for diverting the exhaust gases and/or sand to either one of two traction wheels or to both traction wheels simultaneously.

Still another object is to provide control means at the operator's position in a vehicle for selectively controlling exhaust gas discharge and sand discharge in front of the traction wheels of the vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a top plan view of a chassis of an automotive vehicle fitted with apparatus embodying the invention.

FIG. 2 is a fragmentary perspective view of a dashboard of a vehicle with apparatus control panels thereon.

FIG. 3 is a composite view partially in section, partially in perspective and partially diagrammatic, showing control means, valve assembly and exhaust gas discharge means of the apparatus.

FIG. 6 is a side view partially in section of a portion of a traction wheel and an adjustable exhaust gas discharge pipe.

FIG. 7 is a side view partially in section of a portion of a traction wheel, exhaust gas and sand discharge pipe, and sand supply.

FIG. 8 is a fragmentary perspective view of the discharge pipe of FIG. 7, illustrating its mode of operation.

FIG. 9 is a top plan view similar to part of FIG. 1, illustrating another embodiment of the invention.

FIG. 11 is an enlarged sectional view of a valve assembly employed in the apparatus of FIG. 9.

Figure 4:
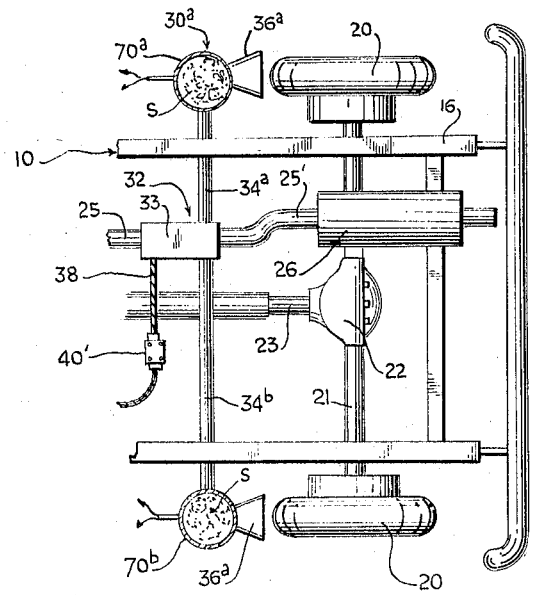
FIG. 4 is a top plan view similar to a part of FIG. 1, illustrating another embodiment of the invention.

Referring first to FIG. 1, there is shown the chassis 10 of an automotive vehicle. The chassis includes an internal combustion engine 12 carried by crossbars 14 of the frame 16. The chassis further includes two front wheels 18 and two rear wheels 20. The rear wheels are carried by axles 21 connected to a differential 22 at which terminates drive shaft 23 driven by engine 14. The engine has an exhaust pipe 25 for discharging exhaust gases and a muffler 26 from which the cooled and silenced gases are discharged rearwardly of the vehicle.

To the extent described, the chassis of the vehicle is conventional. According to the invention, the chassis 10 is provided with apparatus 30, part of which is shown in FIG. 1 for controllably discharging the exhaust gases in front of the rear traction wheels 20. This apparatus includes a valve assembly 32 interposed in the exhaust discharge system. The exhaust pipe 25 is connected to the inlet end of housing 33 of valve assembly 32, and the muffler 26 is connected to one outlet of the valve housing via a short exhaust pipe section 25'. Extending laterally of the housing 33 are two other outlet pipes 34a, 34b. These pipes are connected via tapered connecting sections 35 which terminate in flaring, flattened nozzles 36. Partitions 37 are provided in the nozzles as best shown in FIG. 3, for effectively distributing exhaust gases in a wide stream at each rear wheel. The exhaust stream at each rear wheel has a width substantially equal to the width of the rear wheel. A flexible control cable 38 is connected to the valve assembly. This cable passes through a guide sleeve 40 shown in FIG. 1 and terminates in a control rod 41 in a second guide sleeve 42 shown in FIG. 3. Both sleeves 40, 42 are mounted by brackets 40', 42' at the underside of the vehicle body B indicated in FIG. 3.

FIGS. 2 and 3 show parts of the control system for the apparatus 30. Under the dashboard D of the vehicle is mounted a control panel 44. This panel carries a control lever 45 pivotally supported on a shaft 46. The lever extends outwardly of a slot 47 formed in the panel. On the panel are legends 48 indicating four control lever positions. These legends designate the Muffler, Both Wheels, Right Wheel, and Left Wheel operating positions of the control system of the apparatus.

The lever 45 is a bell crank type of lever with a lower arm 49 having a slot 50 in which is engaged an end of control rod 41 to which the flexible cable 38 is connected. Rod 41 moves axially in the horizontal sleeve 42 and drives cable 38 longitudinally either forwardly or backwardly as the handle 52 of lever 45 is either raised or lowered.

Connected to the rear end of cable 38 is a cylindrical valve piston 54 which moves axially in a bore 55 formed in housing 33. Piston 54 has a diametral bore 56 which can be aligned axially with either one of four bores B1–B4 in the valve housing 33. Exhaust pipe 25 terminates at a large inlet chamber 58 which is connected selectively to any one of the four bores B1–B4 depending on the position of piston 54 in bore 55. Exhaust pipe section 25' which terminates at the muffler 26 is seated in bore B1. Pipes 34a and 34b are seated in bores B3 and B4, respectively. A pipe 60 is fitted in bore B2. This pipe has gas distribution branches 61, 62 connected to pipes 34a and 34b, respectively. In these branches are individual one-way gas check valves 63a, 63b of any conventional type. These valves permit gas to flow to pipes 34a, 34b from pipe 60 but prevent reverse gas flow to pipe 60.

In operation of the apparatus 30, the driver or operator of the vehicle will set lever 45 at the Muffler position under normal driving conditions. In this setting, the piston 54 is in the rear position shown in FIG. 3, where bore B1 connects exhaust pipe 25 directly to exhaust pipe section 25' and muffler 26. Suppose the driver encounters a condition where both rear wheels are blocked by snow so that the vehicle cannot be driven out of a parked location. The driver will then set the lever 45 at Both Wheels position while the engine is running. The piston 54 will be advanced to align bore 56 with bore B2 and exhaust gas will be diverted to both lateral exhaust pipes 34a, 34b via valves 63a, 63b. The hot gas streams issuing from nozzles 36 will quickly melt the snow blocking the rear wheels to restore traction and permit the vehicle to be driven out of the snow. Once the vehicle is clear of the blocking snow, he can set the lever 45 to Muffler position for normal driving. If only one of the rear wheels 20 is blocked, the driver can set lever 45 to either the Right Wheel or Left Wheel position to effect discharge of exhaust gas via bore B2 or B1 and exhaust pipe 34a or 34b to the right or left rear wheel for melting the blocking snow thereat. Thereafter the lever 45 can be reset to Muffler position for normal driving.

FIGS. 4, 5, 7 and 8 illustrate a modification of the invention in which apparatus 30a has two reservoirs or containers 70a, 70b of sand S supported on the body of the vehicle in any suitable manner. The containers are axially vertical and have sand discharge outlet pipes or nozzles 72 connected via individual solenoid controlled valves 74a, 74b to exhaust gas discharge nozzles 36a. Inside each nozzle 36a is a flaring conical or pyramidal gas director 75 supported by brackets 76 in the nozzle 36a. The gas director is spaced from the walls of the nozzle 36a so that sand issues in a wide rectangular stream ST shown clearly in FIGS. 7 and 8. The hot exhaust gas serves to spread the sand in front of and under the rear wheel 20 of the vehicle to increase the traction while the hot gas melts the snow or ice F on the roadway R. Apparatus 30a is useful in normal driving to increase traction and minimize skidding conditions as well as to facilitate extricating a vehicle from a condition where snow and ice block the driving traction wheels of the vehicle.

Figure 5:
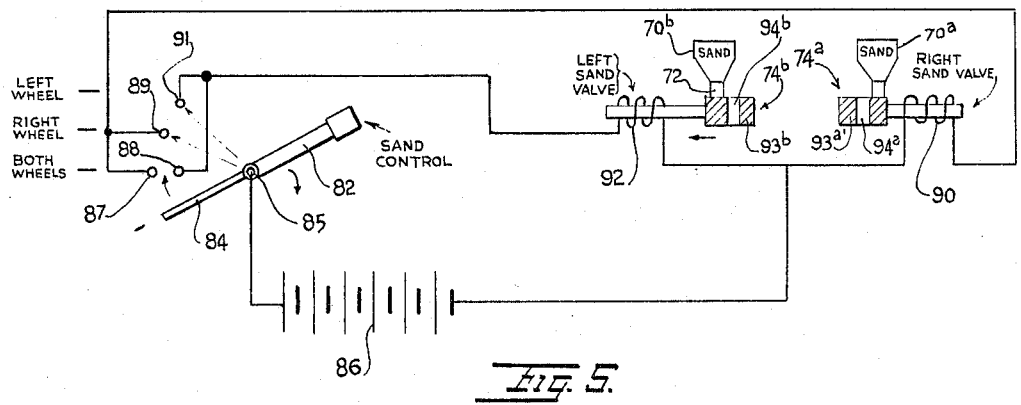
FIG. 5 is a diagrammatic representation of parts of the sand discharge and control system of the apparatus of FIG. 4.

The sand discharge and distribution system includes a control panel 80 shown in FIG. 1 adjacent to the exhaust gas control panel 44 under the dashboard. The panel is provided with a control lever or handle 82 which can be set at any of four positions indicated by legends 83 reading repesctively Off, Both Wheels, Right Wheel and Left Wheel. The lever 82 is an insulated member to which is secured an electrically conductive arm 84 rotated on a pivot 85 to which is connected one terminal of battery 86 as indicated in FIG. 5. As the lever 82 is moved from the Off position, arm 84 first contacts two switch terminals 87, 88. Terminal 87 is connected to switch terminal 89 and to one end of solenoid coil 90 in valve 74a. Terminal 88 is connected to switch terminal 91 and to one end of solenoid coil 92 in valve 74b. The other ends of the solenoid coils are connected to battery 86. Thus when the lever 82 is in Both Wheels position, both solenoid valves are energized and pistons 93a, 93b are advanced to align bores 94a, 94b with the discharge nozzles 72 of the sand container 70a, 70b. When the valves are deenergized, the pistons 93a, 93b are normally retracted to close off the nozzles 72 from the sand containers.

If lever 82 is advanced to Right Wheel position, arm 84 contacts only terminal 89 so that only the solenoid 90 in valve 74a is energized and sand discharges only from container 70a to the right rear wheel of the vehicle. If lever 82 is advanced to Left Wheel position, arm 84 contacts only terminal 91 and only the solenoid 92 in valve 74b is energized, and sand is discharged only from container 70b to the left rear wheel of the vehicle. Setting control lever 82 to the Off position deenergizes both valves 74a, 74b and cuts off the discharge of sand from both containers. It is possible to discharge sand without diverting hot exhaust gases to the rear wheels. This may be desirable where traction is to be improved by discharging sand on ice and it is not desired to melt the ice since this may tend to decrease traction. Also it is possible to discharge hot exhaust gas without sand to melt a mass of snow and ice prior to discharging sand for driving out of a snow and ice blocked location. A particularly valuable feature of the invention is the facility to selectively discharge hot exhaust gas and/or sand at either wheel. Thus the entire exhaust gases can be concentrated on the particular wheel affected by a blocked snow condition.

Figure 10:
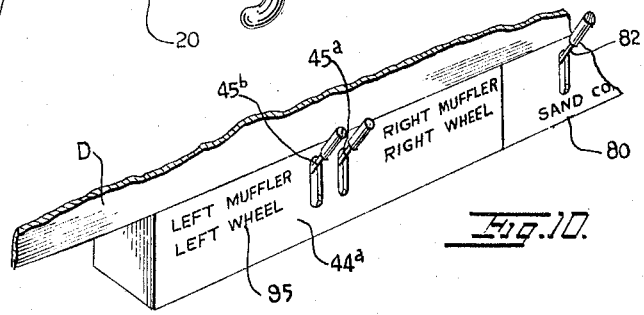
FIG. 10 is a fragmentary perspective view of part of a dashboard of a vehicle with control panels for the apparatus of FIG. 9.

FIGS. 9–11 illustrate an exhaust gas and sand discharge apparatus 30b in which parts corresponding to those of apparatus 30 and 30a are identically numbered. Apparatus 30b is intended for a vehicle in which two exhaust pipes 25a, 25b are provided with two mufflers 26a, 26b. Two valve assemblies 32a, 32b are provided in which inlets of housings 33a, 33b are connected to the respective pipes 25a, 25b. Outlets of the housings are connected to respective exhaust pipe sections 25a' and 26b' to which muffler 26a, 26b are respectively connected. A single exhaust pipe 34a' is connected to housing 33a. A single exhaust pipe 34b' is connected to housing 33b. Pistons 54a, 54b in the several housings have diametral bore 56' movable in bore 55' as best shown in FIG. 11. Each housing has two bores B1' and B2' connected respectively to an exhaust pipe section 25a' or 25b' and to an exhaust pipe 34a' or 34b'. Two flexible cables 38a, 38b are connected to respective pistons 54a, 54b. These cables are connected to drive rods 41' which terminate at individual control levers 45a, 45b shown in FIG. 10. Levers 45a, 45b are of the bell crank type like lever 45 shown in FIG. 2. The levers 45a, 45b each have an upper Left Muffler or Right Muffler or Left Muffler position indicated by legends 95 in FIG. 10 on control panel 44a. The levers have lower Right Wheel and Left Wheel positions also indicated on the panel by legends 95.

The exhaust gas can be diverted from the right muffler 26a to the right wheel 20a or from the left muffler 26b to the left wheel 20b by operation of either lever 45a or 45b.

A sand discharge system may also be included in the apparatus 30b. For this purpose sand control panel 80 such as shown in FIG. 1 is also provided alongside of panel 44a, shown in FIG. 10. The sand containers 70a and 70b are provided at the gas discharge nozzles arranged as shown in FIGS. 7 and 8. The control lever 82 operates switch arm 84 in the same manner as explained in connection with FIG. 5 for actuating either or both or neither of the solenoid control valves 74a, 74b. Operation of apparatus 30b for melting snow and ice and for increasing traction will be the same as explained in connection with apparatus 30 and 30a.

FIG. 6 shows an alternate exhaust pipe construction in which a rectangular, tubular section 96 is secured to nozzle 36'. Section 96 is slidably and adjustably disposed on the end of exhaust pipe 34' and can be secured in place by a wing screw 97. This permits the nozzle to be adjustably located with respect to the front of traction wheel 20'.

There has thus been provided, according to the invention, effective means for utilizing the exhaust gases of an internal combustion engine of a vehicle for extricating the vehicle from a snowbound and icebound condition, for increasing traction in starting and while driving, and for selectively applying hot exhaust gas and/or sand to either or both driving wheels of the vehicle. The principles of the invention may be applied to direct exhaust gases to the front wheels if these are the traction driving wheels, and sand discharge means can also be provided at these wheels. The exhaust gas discharge apparatus can be adapted to apply the exhaust gas to all four wheels of a vehicle, and selectively to any one wheel. Instead of mechanically controlled and electrically controlled valves as illustrated, hydraulic valves may be utilized.

While I have illustrated and described the preferred embodiments of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. In combination with an automotive vehicle having a control panel, a pair of driving wheels, an engine, an engine exhaust pipe for receiving hot exhaust gases from the engine, and a muffler for silencing, cooling and discharging exhaust gases, a valve assembly having an inlet for connection to said exhaust pipe to receive the hot exhaust gases therefrom, and an outlet for connecting said muffler thereto, a pair of outlet pipes connected to two other outlets of said valve assembly, a movable gas distributor member in said valve assembly for selectively passing exhaust gas from said inlet to selected ones of said outlets, nozzles at outer ends of the outlet pipes terminating in front of said wheels respectively, and control means on the control panel operatively connected to said valve assembly for actuating said gas distributor member to divert exhaust gas selectively to one of the nozzles in one position of said member, to the other nozzle in a second position of said member, to both of said nozzles simultaneously in a third position of said member, and to said muffler alone in a fourth position of said member.

2. In combination with an automotive vehicle having a control panel, a pair of driving wheels, an engine, exhaust pipe for receiving hot exhaust gases from the engine, and a muffler for silencing, cooling and discharging exhaust gases, a valve assembly having an inlet for connection to said exhaust pipe to receive the hot exhaust gases therefrom, and an outlet for connecting said muffler thereto, a pair of outlet pipes connected to two other outlets of said valve assembly, a movable gas distributor member in said valve assembly for selectively passing exhaust gas from said inlet to selected ones of said outlets, nozzles at outer ends of the outlet pipes terminating in front of said wheels respectively, and control means on the control panel operatively connected to said valve assembly for actuating said gas distributor member to divert exhaust gas selectively to one of the nozzles in one position of said member, to the other nozzle in a second position of said member, to both of said nozzles simultaneously in a third position of said member, and to said muffler alone in a fourth position of said member, said valve assembly including a housing, said gas distributor member being a piston disposed in said housing, a flexible cable connecting said piston to said control means, said housing having four bores, three of said bores being connected to the outlets respectively of said valve assembly, a fourth one of the bores being connected to two of the bores via one-way valves, said piston having a transverse bore located in alignment with a different one of the bores in each of the four positions of the gas distributor member, so that said inlet is connected in communication with at least one outlet in each of the four positions of said member.

3. In combination with an automotive vehicle having a control panel, a pair of driving wheels, an engine, an engine exhaust pipe for receiving hot exhaust gases from the engine, and a muffler for silencing, cooling and discharging exhaust gases, a valve assembly having an inlet for connection to said exhaust pipe to receive the hot exhaust gases therefrom, and an outlet for connecting said muffler thereto, a pair of outlet pipes connected to two other outlets of said valve assembly, a movable gas distributor member in said valve assembly for selectively passing exhaust gas from said inlet to selected ones of said outlets, nozzles at outer ends of the outlet pipes terminating in front of said wheels respectively, and control means on the control panel operatively connected to said valve assembly for actuating said gas distributor member to divert exhaust gas selectively to one of the nozzles in one position of said member, to the other nozzle in a second position of said member, to both of said nozzles simultaneously in a third position of said member, and to said muffler alone in a fourth position of said member, each of said nozzles being connected to one of the outlet pipes by an adjustable connector for adjustably positioning the nozzles at the drive wheels.

4. In combination with an automotive vehicle having a control panel, a pair of driving wheels, an engine, a pair of engine exhaust pipes for receiving hot exhaust gases from said engine, and a pair of mufflers for silencing, cooling and discharging exhaust gases, a pair of valve assemblies, each valve assembly having an inlet for connection to a different one of the exhaust pipes, and having an outlet for connecting a different one of the exhaust pipes, and having an outlet for connecting a different one of the mufflers thereto, a pair of outlet pipes each connected to another outlet of one of the valve assemblies, a movable gas distributor member in each valve assembly for selectively passing exhaust gas from the inlet to either one of the outlets in the valve assembly, a pair of nozzles at outer ends respectively of the outlet pipes disposed near the drive wheels respectively, and control means on the control panel operatively connected to the respective valve assemblies for actuating the gas distributor members in the valve assemblies selectively to divert exhaust gas from the inlet in one valve assembly to one of the nozzles, to divert exhaust gas from the inlet in the other valve assembly to the other nozzle, to divert exhaust gas from the inlets in both valve assemblies to both nozzles simultaneously, and to divert exhaust gas from the inlets in both valve assemblies to the mufflers, each of said nozzles being connected to one of the outlet pipes by an adjustable connector for adjustably positioning the nozzles at the drive wheels.

References Cited by the Examiner
UNITED STATES PATENTS

| 1,277,333 | 8/1918 | Meakin. | |
| 2,515,341 | 7/1950 | Giguere | 126—271.1 |
| 2,677,563 | 5/1954 | Weiner. | |
| 3,232,287 | 2/1966 | Gillingham et al. | 126—271.1 |

CHARLES J. MYHRE, *Primary Examiner.*